United States Patent [19]

Waterhouse

[11] 4,363,856
[45] Dec. 14, 1982

[54] BATTERY SEPARATOR MATERIAL

[75] Inventor: John F. Waterhouse, Northampton, Mass.

[73] Assignee: Texon Inc., South Hadley, Mass.

[21] Appl. No.: 243,616

[22] Filed: Mar. 13, 1981

Related U.S. Application Data

[62] Division of Ser. No. 164,588, Jun. 30, 1980, abandoned.

[51] Int. Cl.³ .............................................. H01M 2/16
[52] U.S. Cl. .................................... 429/143; 429/147
[58] Field of Search ......................... 429/143, 147, 94; 427/72, 58; 428/105, 114, 245, 292, 294

[56] References Cited

U.S. PATENT DOCUMENTS

| | | | |
|---|---|---|---|
| 3,228,803 | 1/1966 | Little | 429/143 X |
| 3,734,778 | 5/1973 | Huf et al. | 429/94 X |
| 3,773,590 | 11/1973 | Morgan | 429/143 X |
| 4,055,711 | 10/1977 | Ikari | 429/143 |
| 4,205,123 | 5/1980 | Palmer et al. | 429/147 |
| 4,245,013 | 1/1981 | Clegg et al. | 429/147 X |

Primary Examiner—Charles F. LeFevour
Attorney, Agent, or Firm—Webb, Burden, Robinson & Webb

[57] ABSTRACT

A battery separator material which is folded to form an envelope is heat sealed along at least two opposing edges thereof to form a battery separator. The separator material is comprised of discrete polyolefin pulp fibers in a sufficient amount to heat seal the separator along its edges. The fibers are bound by an organic polymeric binder. A process of forming the battery separator is also disclosed.

1 Claim, 5 Drawing Figures

BATTERY SEPARATOR MATERIAL

This application is a division of application Ser. No. 164,588, filed June 30, 1980, now abandoned.

BACKGROUND OF THE INVENTION

1. Field of the Invention

This invention relates to battery separator material and more particularly to battery separators which fully envelope the electrolytic plates.

2. Description of the Prior Art

Electrolytic cells (i.e. batteries) formed by spaced apart metal plates connected in series for storage of electric energy are useful for a variety of purposes. The plates of the electrolytic cells tend to form an active substance on the surface of the electrodes. When the active substance drops off, battery capacity drops, and also the degradation of the metal electrodes forms products including metals salts and other conductive substances which tend to bridge between two electrodes, thereby short circuiting the cell. These salts are degraded metal products are primarily due to the highly acidic environment in storage batteries.

In order to protect the electrode plates, separators have been used between the plates which are porous, thereby allowing ionic exchange through the separator while providing adequate separation between the cells to prevent short circuiting. Typically, these separators are constructed of cellulose fiber or fused polyolefin sheets. Exemplary of battery separators are those disclosed in U.S. Pat. Nos. 2,973,398; 3,890,184; 4,024,323; 4,055,711; 4,113,927; 3,753,784; 3,694,265; 3,773,590; 3,351,495; 3,340,100; 3,055,966; 3,205,098 and 2,978,529.

Battery separators having improved properties have been required with the introduction of what is known as the "maintenance free battery." The maintenance free battery is one which is a sealed unit and does not require the intermittent addition of water thereto. Typically, the battery separator in a maintenance free battery is preferably an envelope sealed on at least three sides in order to prevent bridging with metal salts between electrodes. A primary requirement of these battery separators is that they must have sufficient porosity in order for the ionic exchange to occur while the pores of the separator must be sufficiently small to prevent the migration of heavy metal ions and, consequently, bridging which short circuit the cell.

Further requirements of a battery separator for a lead-acid battery are resistance to acid and oxidative and reductive chemical reactions because of the highly acidic environment within the battery. Also, separators should have as low an electrical resistance as possible to provide good cold discharge performance.

In accordance with the invention, a battery separator material is provided which has excellent filtering, electrical, chemical and physical properties which is readily fabricated and may be folded and heat sealed along the edges in the form of an envelope to act as a battery separator, particularly in a maintenance free battery.

BRIEF DESCRIPTION OF THE INVENTION

A battery separator material which is folded to form an envelope is heat sealed along at least two opposing edges thereof to form a battery envelope. The separator material is comprised of discrete polyolefin pulp fibers in a sufficient amount to heat seal the separator along its edges. The fibers are bound by an organic polymeric binder.

DETAILED DESCRIPTION OF THE INVENTION

The fibers useful in the practice of the invention are those fibers capable of withstanding strong acid, such as is present in electrolytic cells.

A major portion of the fibrous content of the battery separator material of the invention is polyolefin pulp fibers which are synthesized from the polymerization of ethylene and/or propylene or mixtures thereof, such as to produce polyethylene, polypropylene or poly(ethylene-propylene) copolymers and have a fiber diameter of up to 100 microns. Preferably, these polyolefin pulp fibers have a fiber diameter of 0.01 to 20 microns, have a softening point below 340° F., and are up to 0.5 inch a length. The polyolefin pulp fibers are present in a weight range from 30 to 100 percent by weight, and preferably 70 to 90 percent by weight based upon the nonbinder constituents of the separator material.

The polyolefin fibers most useful in the practice of the invention are those which are characterized as synthetic wood pulps. These polyolefin fibers have a surface treatment which imparts wettability and ease of dispersion in water to the fibers. Typically, the surface tension of the polyolefin fibers is about 70 mN/m. Typical properties of the polyethylene and polypropylene fibers are those which have: (1) a specific gravity of less than one and more preferably between about 0.900 and 0.965 kg/dm$^3$; (2) a melting point of between about 250° and 340° F.; (3) a yield stress of greater than 300 daN/cm$^2$; (4) a tensile strength at break of greater than 200 daN/cm$^2$; (5) a modulus of elasticity in tension of 7,000 to 20,000 daN/cm$^2$; and (6) a dielectric constant of 2 to 4, a dielectric strength of 2 to $5 \times 10^2$ kv/cm and a transverse resistivity of $10^{15}$ to $10^{18}$ $\Omega$cm.

The polyolefin pulp fibers comprise a major portion of the battery separator material for several reasons. Among the reasons are that they are substantially inert to acidic conditions such as are present in electrolytic cells and, secondly, they have the desired softening point of below 340° F. so that the fabricated battery separator can be heat sealed along at least two opposing edges thereof to form an envelope. They have low ohmic resistance due to their diameters. Further, the polyolefin pulp fibers have sufficient flexibility so that the final battery separator material can be folded and worked while providing good envelope integrity and ease of processing on papermaking equipment.

In addition to the polyolefin pulp fibers, staple glass fibers may be incorporated into the battery separator material in order to impart rigidity and tensile strength while maintaining the inert chemical characteristics and low ohmic resistance of the battery separator. Preferably, the glass fibers useful in the practice of the invention have fiber diameters less than 20 microns as the mean diameter. The fibrous component as glass constitutes up to 60 percent by weight based on the nonbinder content of the separator material and preferably 5 to 15 percent by weight. Exemplary of the glass fibers useful in the practice of the invention are the glass microfibers, i.e. those having fiber diameters of 0.20 to 4.0 microns. These glass fibers may be of preferred compositions known as soda-lime borosilicate or C glass with excellent chemical durability sold by Johns Mansville Corporation.

In addition to the polyolefin pulp fibers and the glass fibers, polyester and/or polyolefin staple fibers and/or cellulose pulp fibers may be incorporated into the battery separator material. These polyester and/or polyolefin staple fibers preferably have a denier of 0.5 to 1.5 and are incorporated at a level of up to 30 percent and preferably 5 to 15 percent by weight based on the nonbinder constituents of the separator material.

In addition, fillers may be used to reduce the pore size of the battery separator material. The fillers are used at a level of up to 60 percent and preferably 40 to 60 percent by weight based upon the nonbinder content of the separator material. The fillers useful in the practice of the invention are those which are particulate fillers having an average particle size of 0.02 to 20 microns, such as kaolinite, halloysite, montmorittonite, tinite and illite which are all clays, and other fillers such as silica, quartz, calsite, luminite, gypsum, muscavite, diatomaceous earth and the like. In addition to the inorganic fillers, organic fillers having a particle size of 0.2 to 50 microns may also be used for the same purpose as the inorganic fillers. These organic fillers are typically inert thermoplastic organic polymers such as hydrocarbon polymer powders. Typical polymers are polystyrene and polyolefin polymers and copolymers. The fillers reduce the ohmic resistance and pore size along with the cost of the battery separator material.

The fibers and filler are bound together by an organic binder preferably supplied as a latex or aqueous dispersion. Preferably, the binder is the polymer of monoethylenically unsaturated monomers. "Monoethylenically unsaturated," as used herein, is characterized by the monomer having a $>C=CH_2$ group. These monoethylenically unsaturated monomers are, but not limited to, the acrylic monomers such as methacrylic acid, acrylic acid, acrylonitrile, methacrylonitrile, methylacrylate, methylmethacrylate, ethylacrylate, ethylmethacrylate, acrylamide and the like; olefin hydrocarbons such as ethylene, butylene, propylene, styrene, alpha-methylstyrene and the like; and other functional unsaturated monomers such as vinyl pyridine, vinyl pyrollidone and the like. Typically, these polymers are acrylic polymers dispersed in water at a level of 30 to 50 percent by weight and are in the form of a latex. Additionally, the polymer should be film forming.

Although the polymers useful in the practice of the invention may be provided with sufficient functional groups to self-crosslink, i.e. crosslink without the addition of other materials, crosslinking agents may be added to provide the required crosslinking characteristics. Preferably, the polymers will crosslink at a temperature below 200° F. and in a preferred range of 150° to 190° F.

Crosslinking agents suitable in the practice of the invention include aldehydes such as formaldehyde, glyoxal, acrolien and the like; synthetic resin precondensates obtained by the reaction of an aldehyde generally with compounds containing nitrogen, like dimethylol urea, dimethylolethylene urea, di- and trimethylol triazon dimethyluron, di- and trimethylol melamine and other cyclic or noncyclic, water soluble or non-water soluble precondensates of urea and melamine formaldehyde. The reactive methylol groups may be blocked or partially blocked by alcohols having 1 to 4 carbon atoms. Apart from the above, other known crosslinking agents too may be used, such as diepoxides and epichlorin derivatives thereof, dichlorophenols, beta substituted diethyle sulfones, sulfonium salts, N-methylolacrylamide and methylacrylamide and derivatives thereof, diisocyanates and the like. Up to 4 percent of the crosslinking agent may be incorporated into the binder composition. Too much crosslinking agent may render the sheet material too brittle or hard and not provide the required flexibility for forming the battery separator.

The use of an organic binder for binding the polyolefin pulp fibers to form a battery separator material is a substantial improvement over the prior art. While the prior art teaches that polyolefin fibers of continuous or long staple characteristics can be heat fused to form a separator material such heat fusion requires complicated and expensive processing. To the contrary binding of the polyolefin pulp fibers with an organic binder avoids these complicated and expensive processing steps by providing a battery separator material which can be fabricated on standard papermaking equipment. In addition, the battery separator material in accordance with the invention shows increased strength and elongation over prior art pulp fiber separator material, thus providing a material with improved integrity and improved handling and fabrication properties.

The battery separator material which is formulated in accordance with the invention has a preferred porosity between 50 to 70 percent, as calculated by the following equation:

$$\%E = (1 - \rho_a/\rho_f)100$$

where E is porosity, $\rho_a$ is apparent density of the battery separator material and $\rho_f$ is the columbic density of the material.

Further, the battery separator material has an ohmic resistance of between 0.001 ohms in$^2$ to 0.025 ohms in$^2$ and more preferably below 0.020 ohms in$^2$.

The battery separator material of the present invention may be formed on standard papermaking apparatus such as a fourdrinier, an inclined fourdrinier, a cylinder machine, a rotoformer or the like. A typical process involves charging the fibrous constituents along with the filler and a large quantity of water to a pulper. The pulper disperses the fiber and filler in the water. Various polyelectrolytes and surface active agents may be added to provide the appropriate chemical and physical properties in accordance with standard papermaking techniques. The fiber and filler slurry is then charged to the machine chest of a fourdrinier papermaking machine. From the machine chest the slurry is transferred onto the moving wire of the fourdrinier and water is allowed to drain therefrom. After the draining of the water by gravity, suction is applied to the wet web to further remove water from the web. The web is then pressed between felt rolls. After wet pressing, the wet web passes through a saturator, where the binder is applied. Finally, the sheet is dried on drying cans. The drying temperature required is between 230° to 260° F. During the drying cycle, the binder may be crosslinked if it has sufficient functionality to do so, or there is a crosslinking agent in the furnish or in the binder. It is preferred that the drying be conducted at a temperature below the fusion temperature of the polyolefin fibers so as to maintain them as discrete fibers rather than fused fibers. The sheet material is then calendered to a uniform thickness and may be embossed on one side thereof and wound on rolls. In the alternative, the binder can be applied to the dry web and redried. Preferably, the battery separator material has a thickness of 0.005 inch to 0.040 inch.

These materials may be used for enveloping or may be cut to the appropriate size and used as a leaf separator per se.

Preferably, the separator material is embossed on one side thereof and a rib is formed of extruded polyolefin plastic on the opposing side of the embossment. The rib is applied by extrusion of molten polyolefin resin onto the separator in a generally cross-sectionally triangular configuration through a die.

In forming the rib, low density polyolefin pellets are fed into the hopper of an extruder which is in communication with a single piece die head. A series of polyolefin strands of circular cross section are extruded through the die lip attached to the front of the die head. The strands are aligned and directed onto the cooled female portion of the die roll pair just prior to the nip formed between the profiled female and the male die. At the nip the polyethylene strand is contacted with the separator web and the profile of the rib is established, together with the emboss on the back web of the separator material. Contact is maintained with the cooled female die roll to insure solidification and release of the profiled rib. The polyolefin strand is at a sufficient temperature to soften the pulp fibers in the web, thereby fusing the rib and the web into a unitary construction.

The triangular configuration of the rib provides necessary spacing between the electrolytic plate and the separator material to allow for circulation of the electrolytic solution about the plate. Further, the top of the rib aligns with the embossment on the opposing side so that there is a guide for true rolling of the battery separator material during winding subsequent to production and unwinding for fabrication into battery separators. Preferably, the height of the triangular cross section is about 0.010 to 0.100 inch with a base correspondingly configured to generally form an equilateral triangle.

In producing the battery separator from the battery separator material which is wound on reels, the reel is unwound and fed into an enveloping machine which folds the battery separator material around the electrolyte plate and heat seals it along opposing edges thereof. The electrolytic plate may also be inserted into a preformed envelope and the enveloped electrolytic plate is mounted within a battery casing.

The invention is illustrated by reference to the following drawings.

DETAILED DESCRIPTION OF THE DRAWINGS

Figure 1:
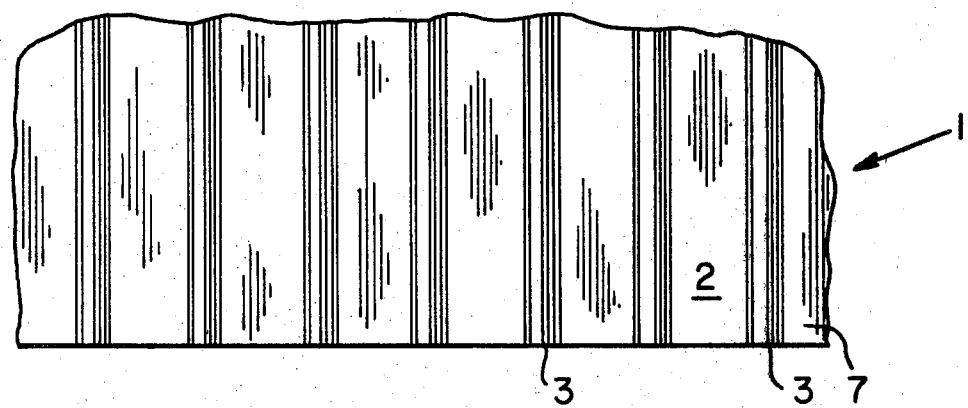
FIG. 1 is a top view of the battery separator of the invention.
Figure 2:
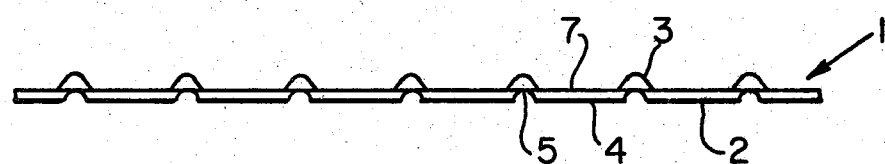
FIG. 2 is an end cross-sectional view of the battery separator of FIG. 1.
Figure 3:
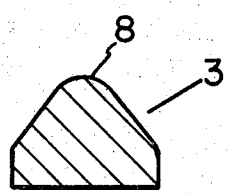
FIG. 3 is a cross section taken through one of the ribs shown in FIGS. 1 and 2.
Figure 4:
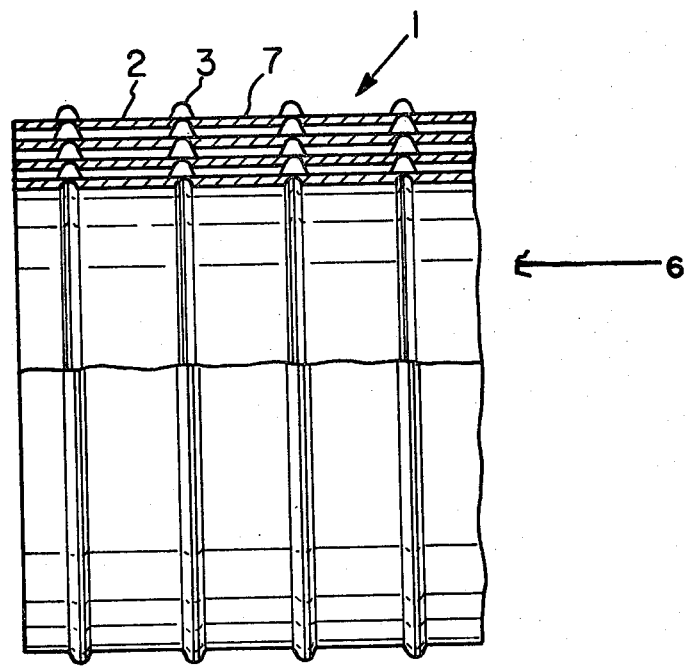
FIG. 4 is a front view partially in section of the battery separator material of FIG. 1 on a roll.
Figure 5:
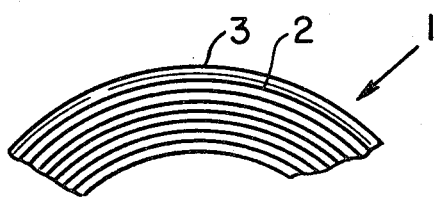
FIG. 5 is an exploded view of a portion of the roll of FIG. 4.

Referring now to FIGS. 1 through 5, wherein like reference numerals refer to like parts, there is shown a battery separator material generally designated by the numeral 1, which is composed of a continuous web formed as previously described with a plurality of polyolefin ribs 3 of generally triangular cross-sectional configuration on one side 7 of the web 2. On the opposing side 4 of the web 2 there is provided a plurality of embossed grooves 5 which are adapted to receive the ribs 3 when the battery separator material is wound on a roll 6, as is shown in FIG. 4. The embossment 5 is configured so as to receive the apex 8 of the rib 3 so that when the material is rolled the apex 8 of the rib 3 and the embossment 5 mate to form an interlocking arrangement for true rolling. More specifically, FIG. 5 shows the interengagement of the embossment 5 and the rib 3 when the material is wound on a roll.

The invention will be further illustrated by the following example.

EXAMPLE 1

A furnish composed of the following ingredients was prepared:

| Ingredient | Parts by Weight |
| --- | --- |
| Pulpex EA (by Hercules synthetic wood pulp - avg. fiber diameter 4.9 microns) | 80 |
| Microglass 112 (glass microfibers sold by Johns Mansville) | 15 |
| Dacron ¼ inch, 1.5 denier | 5 |

The above furnish was charged to a pulper and 24 parts water was added thereto. The material was agitated in the pulper until a uniform slurry was prepared. The slurry was pumped to the machine chest of a fourdrinier papermaking machine.

The slurry was pumped to the head box of the fourdrinier. The slurry was fed onto the moving screen of the fourdrinier, water was allowed to drain by gravity, and then suction was applied. The wet web was saturated in a saturator with 11 parts by weight of a self-crosslinking film forming acrylic latex sold under the trademark Polymerics 1440 having a pH 5.45 and a weight average molecular weight of about $10^6$ and 0.11 parts be weight of Aerosol OT (sodium dioctyl sulfosuccinate) an ionic surfactant by American Cyanamide. The wet web was then dried by passing it over heated rolls to impart a temperature of 260° F. to the web.

The sheet material from the fourdrinier was calendered and embossed to form linear indentations longitudinally oriented on the sheet material. A triangularly cross-sectioned polyolefin rib of low density polyolefin having a melt index of 5 g/10 min. at 300° F. (manufactured by Rexene Polyolefins Co.) having a base of 0.036 inch and a height of 0.034 inch was extruded on the material opposing the indentations.

The material was wound as a roll with the apex of the triangular rib nested in opposing indentations on the material.

The material was unwound and fed into a Dale enveloping machine which cut the material to a predetermined size, folded each piece in half and heat sealed opposing open edges of the envelope.

The battery separator had the following properties:

| Property | Value |
| --- | --- |
| Backweb $t_b$ ins | 00.013 |
| Overall $t_o$ ins | 00.038 |
| Weight/area g/m² | 89.000 |
| Air porosity, ¼" | |

| Property | Value |
| --- | --- |
| orifice, secs. | 93.100 |
| Ohmic Resistance 20 mins Ω in² | 00.019 |
| Ohmic Resistance 24 hours Ω in² | 00.015 |
| Apparent density[1] | 00.377 |
| % Porosity[1,2] | 67.200 |
| Pore diameter avg. in microns | 08.700 |
| % Volume greater than 20 microns | 11.000 |
| % Columbic density | 01.100 |
| Tensile strength lbs. | 04.600 |
| % Elongation | 06.500 |

[1] Measured on an Aminco Mercury Porosimeter under liquid mercury pressure.

[2] $\% \text{ Porosity} = \left(1 - \frac{\text{apparent density}}{\text{columbic density}}\right) \times 100$ The battery separator fabricated in accordance with Example 1 was used in a lead-acid storage battery and tested for performance. The battery tests were run according to the Battery Counsel Industry (BCI) recommended specifications for vehicular, ignition lighting and starting types. The results are as follows.

| Discharge Performance Characteristics | |
| --- | --- |
| Reserve Capacity 25 amps at 80° F. minutes to 10.5 volts | 109 minutes |
| Cold Crank 450 amps at 0° F. voltage at 30 sec. | 7.25 volts |

EXAMPLE 2

A furnish composed of the following ingredients was prepared:

| Ingredient | Parts by Weight |
| --- | --- |
| Pulpex EA | 50 |
| Hi Sil 233 (silica) | 40 |
| Dacron 0.75 denier | 10 |

The above furnish in hand sheet form was processed and the binder applied similar to the production machine, Example 1, except that the ionic surfactant was eliminated. The battery separator was formed in accordance with Example 1 and had the following properties:

| Property | Value |
| --- | --- |
| Backweb $t_b$ ins | 0.011 |
| Weight/area g/m² | 92.8 |
| Porosity ¼" secs. | 176 |
| Ohmic Resistance 20 min Ω in² | 0.009 |
| Ohmic Resistance 24 hours Ω in² | 0.008 |
| Apparent density | 0.337 |
| % Porosity[4] | 63.4 (calculated max. 73.5%) |
| Pore diameter avg. diameter microns | 13.9 |
| Tensile strength lbs. | 6.1 |
| % Elongation | 15.9 |

[4] Limited by porosimeter range

As is demonstrated by Example 2, a battery separator material having a high filler loading has excellent physical and electrical properties.

As can be seen from the foregoing description of the invention, a battery separator material is provided which can be easily fabricated into a battery separator having excellent chemical, physical and electrical properties.

Although the invention has been described with reference to specific compositions and processes, the invention is only to be limited so far as is set forth in the accompanying claims.

I claim:

1. A roll of battery separator material having one side thereof embossed to form a plurality of longitudinally extending indentations parallel and laterally spaced across the width of said material and on the opposing side thereof having a plurality of ribs of polyolefin material extruded thereon, each of said ribs having a substantially triangular cross section and positioned in alignment with an indentation and having an apex in mating engagement therewith to prevent lateral slipping of laps of the roll and provide alignment for feeding off the roll.

* * * * *